T. J. STEFFE & L. KNIGHT.
Meat-Mincing Machine.
No. 222,209. Patented Dec. 2, 1879.
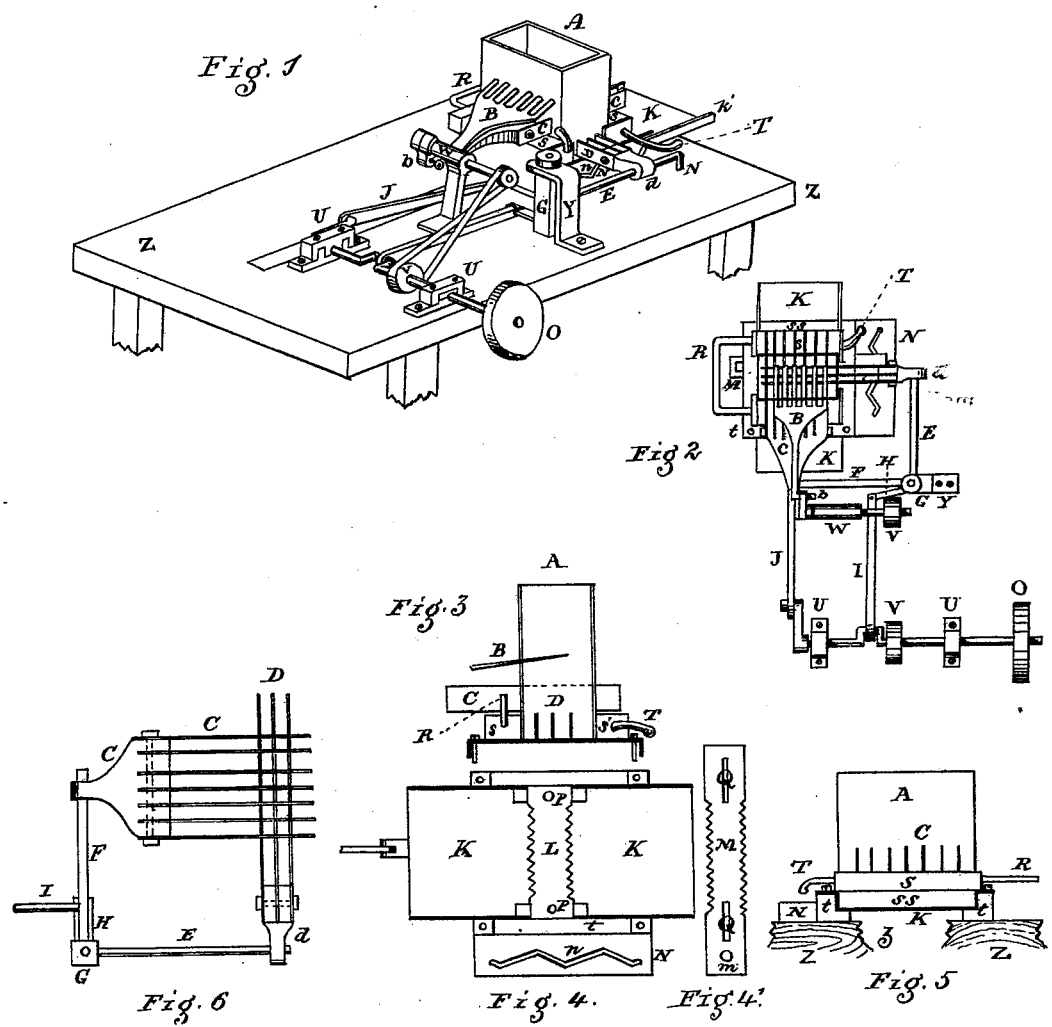
WITNESSES.                    INVENTORS.

UNITED STATES PATENT OFFICE.

THEODORE J. STEFFE AND LEWIS KNIGHT, OF LANCASTER, PA., ASSIGNORS OF ONE-THIRD OF THEIR RIGHT TO JOHN H. WEICHEL, OF SAME PLACE.

IMPROVEMENT IN MEAT-MINCING MACHINES.

Specification forming part of Letters Patent No. 222,209, dated December 2, 1879; application filed March 20, 1879.

*To all whom it may concern:*

Be it known that we, THEODORE J. STEFFE and LEWIS KNIGHT, of the city of Lancaster, in the State of Pennsylvania, have invented certain Improvements in Machines for Mincing Animal Fat or Meat, of which the following is a specification.

This invention relates to a class of mincing-machines more especially adapted for the use of butchers for cutting up animal fat, stearine, &c., into small cubic pieces, to be the more readily fused and rendered into lard or tallow, in combination with a means of warming the fat and cutters during cold weather, to prevent the clogging heretofore so objectionable during the winter season.

The accompanying drawings, with the letters of reference marked thereon, and a brief description will enable those skilled in the art to make and use the same, in which—

Figure 1 is a perspective view of the machine, with a part of the table or support. Fig. 2 is a ground plan or as seen directly from above. Fig. 3 shows a side view of the hopper detached from the side ledges which are affixed to the table Z, and the side heating-chambers S combined with it. Fig. 4 is a top view of the traveling tray or flanged table K, the side ledges *t* forming guides, as well as raising it from contact with the table Z; Fig. 4', the moving knife or double cutter detached. Fig. 5 shows the rear end of the hopper, steam-chamber, cleaner, and edge of the tray, with its side flanges and guide-pieces *t*.

The table Z is provided with a slot for the crank-arm and rod J and pulley *v*, and a square central opening, *z'*, under the fixed hopper or feed-box A and traveling tray K, through which opening the minced product is discharged into a suitable receiver.

The side pieces or guides *t* have right-angled flanges, and between them the traversing so-called "tray" or "table" K is supported and guided in its back-and-forth motions horizontally beneath the hopper by means of a rod, J, and crank-connection. This tray has only side flanges, and is open centrally or separated, into which space a knife, L, is laid flush and duly fitted from one side of the tray to the other. This knife has a short stout pin, P, near each end, to enter a slot, Q, in each end of its counterpart M, Fig. 4', so as to slide back and forth in close contact over it by means of a pin, *m*, in M at its outer end extending into a zigzag or cam slot, *n*, made in a raised fixed platform, N, on the outer side of ledge *t*, so that by the direct movement of the tray, carrying the knives the full stroke of the crank action, the pin in the zigzag slot gives the upper knife a back-and-forth cross-motion; and as both knives L and M have cutting sickle-form teeth on each edge, they cut reciprocally in their movement under the hopper, to which space all the material is confined, by the cross-scrapers *s s* affixed across the tray, and dipping to its upper face between the side flanges, front and rear, Fig. 5, and is in close contact. Said cleaners *s s*, being affixed to the base of the steam-chamber S, prevent any material coming outside by the motions of the moving tray or table K, supporting it inside the hopper.

In order to cut the material into square slices first, two series of knives are made to pass through the hopper at right angles to each other, one series above the other.

Fig. 6 illustrates their combination. G is a square rocking upright in bearings Y, Fig. 1, having an arm, H, and rod I, connecting it with a crank, from which it receives motion. A rod, F, on one side connects with the upper knife-head, *c*, carrying seven thin blades, C. At right angles to this is another rod, E, connected to the knife-head, *d*, showing three cutting-blades, D, which latter are in close connection with the upper series and directly over the base-plate or hopper-support, and also close to the traversing blades in the tray K. There is also a press and feed device, B, a kind of six-pronged fork that enters the hopper through openings made over the slots for the knives C. This fork B receives the compound raising and pressing down motion of a crank, *b*, on a shaft supported in a long bearing, W, on the top of a standard, and receives motion by having a strap-pulley connection with the main crank-shaft to which the power is applied at O. U, the boxes; V, the inner pulley referred to, the several cranks and rod-connections imparting reciprocal motion to the several parts, as herein specified.

During cold weather the stearine and fats are apt to clog and cause trouble. This is prevented by attaching heating-chambers S on two sides to the base of the hopper, with steam-pipes R passing through the chambers, with an outlet for the exhaust or water at T, which keeps the knives and material in proper condition for cutting.

The feeding and pressing fork B is braced by the material of hopper A surrounding the holes through which the tines of said fork work. The perforated hopper also acts as a guide for causing said fork to approximate at all times a horizontal position sufficiently to insure a certain pressing down action of the lower sides of said tines upon the meat within said hopper, so that all the meat behind the points of said tines is more or less compressed by the action of said fork. The crank which operates said fork is made of such length as to give said fork a throw which nearly reaches the opposite side of the hopper, and said parts are so arranged that the vibration of said fork within said hopper varies but little from a horizontal line.

We are aware that straw-cutting machines have been provided with feeding-forks which reciprocate with a compound motion; also, that meat-chopping machines have been provided with double sets of cutting-knives working horizontally and transversely to one another. Hence we do not, broadly, claim either of these constructions; but What we do claim, and desire to secure by Letters Patent, is—

1. The combination of the flanged traversing tray or table K, the side guides and supporting-ledges $t$, the attached cross-pieces or tray-cleaners $s\,s$, said tray being centrally provided with a fixed two-sided toothed cutter, L, and sliding counterpart or cutter M, operated by a pin and zigzag slot in a fixed side cam-table, N, during the movement of the tray, substantially as and for the purposes set forth.

2. In combination with reciprocating feeding-fork B, the hopper A, perforated to receive the tines of fork B, and serving to brace and guide the same, as set forth.

3. In combination with the base of the hopper A, the heating side chambers S, connecting-pipe R, and exhaust or drain pipe T; substantially as and for the purposes set forth.

THEODORE J. STEFFE.
LEWIS KNIGHT.

Witnesses:
H. R. McCONOMY,
JACOB STAUFFER.